Sept. 3, 1935.  C. F. BELSHAW  2,013,263
REFRIGERATOR
Filed June 1, 1933  2 Sheets-Sheet 1

Inventor:
Charles F. Belshaw
By: Wm. O. Bell
Atty.

Sept. 3, 1935.  C. F. BELSHAW  2,013,263
REFRIGERATOR
Filed June 1, 1933   2 Sheets-Sheet 2
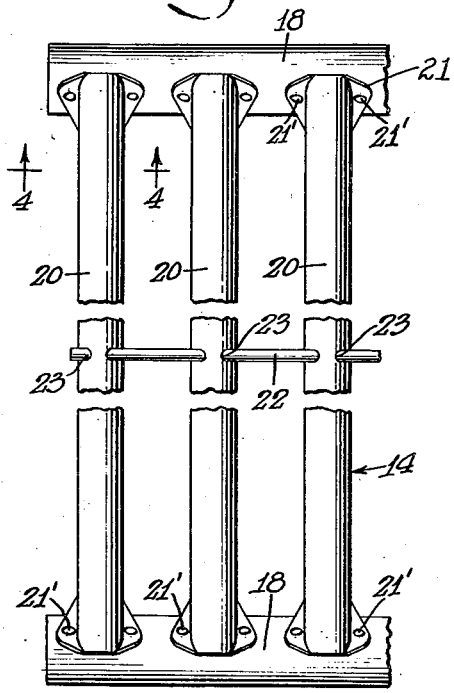
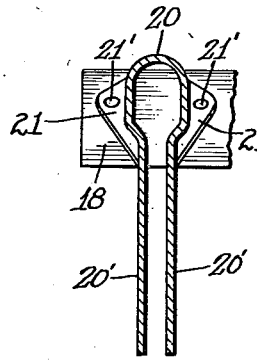
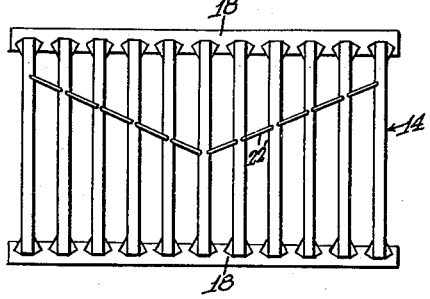
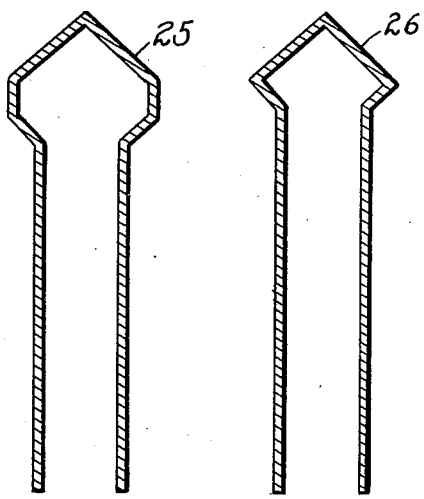
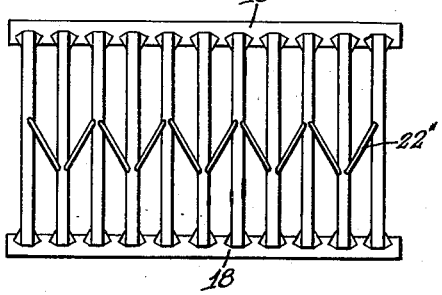
Inventor:
Charles F. Belshaw
By: Wm. D. Bell
Atty.

Patented Sept. 3, 1935

2,013,263

UNITED STATES PATENT OFFICE 2,013,263

REFRIGERATOR

Charles F. Belshaw, Duluth, Minn., assignor to The Coolerator Company, a corporation of Minnesota Application June 1, 1933, Serial No. 673,846

12 Claims. (Cl. 62—46)

This invention relates generally to ice refrigerators and more particularly to the rack for supporting the ice in the ice chamber. It frequently happens that a cake of ice will melt unevenly at the bottom so that the cake will assume a tilted position on the ice rack and contact with a wall of the ice chamber thereby causing the ice to melt more rapidly, and this tilting will continue and increase as the ice melts until finally there remains a piece of ice of irregular shape on the rack which will interfere with and make it difficult to insert a fresh cake of ice in the ice chamber and position it on the ice rack spaced from the four walls of the ice chamber in as nearly centered position as may be convenient.

An object of the invention is to prevent circulation of air from the food compartment into the ice chamber by employing the cake of ice in the ice chamber to shut off communication with the food compartment and to maintain the cake of ice in this position by preventing it from floating or sliding forward or backward on the rack bars.

Another object is to maintain the ice cake in substantially centered and level position in the ice chamber, spaced from the four walls thereof, and to prevent it from floating or sliding forward or backward or tilting sufficiently to contact with a wall of the ice chamber, so that at all times the cake will be insulated from the walls of the ice chamber by the air surrounding the cake in the chamber, and melting of the cake will be substantially confined to the bottom of the cake and the cake will lower evenly as it melts and without changing its position in the ice chamber to any material extent.

A further object of the invention is to cause the ice cake to become anchored with the rack as the cake melts, thereby making it difficult, if not impossible, to remove the cake from the ice chamber, which is of special importance where the ice is supplied on a contract basis.

Another object of the invention is to provide means for insuring that the ice cake will melt substantially evenly and maintain a substantially upright and level position in the ice chamber so that when the cake becomes almost exhausted it will present a level surface upon which a fresh cake can be placed or slid easily into position in the ice chamber.

Another object is to provide an ice rack of novel form designed to enlarge the space between the ice supporting rack bars and the ice fins depending from the cake therebetween and thereby enable a greater volume of air to circulate in cooling proximity to the ice fins than has been possible heretofore.

A selected embodiment of the invention is illustrated in the accompanying drawings in which, Fig. 1 is a vertical sectional view of a refrigerator with the lower part thereof broken away.

Fig. 3 is a plan view of a part of the ice rack.

Fig. 4 is a sectional view on the line 4—4 of Fig. 3 showing a preferred form of rack bar.

Fig. 5 is a plan view of a modified form of ice rack.

Fig. 6 is a plan view of another form of ice rack.

Fig. 7 is a vertical sectional view showing another form of rack bar.

Fig. 8 is a vertical sectional view of still another form of rack bar.

Figure 1:
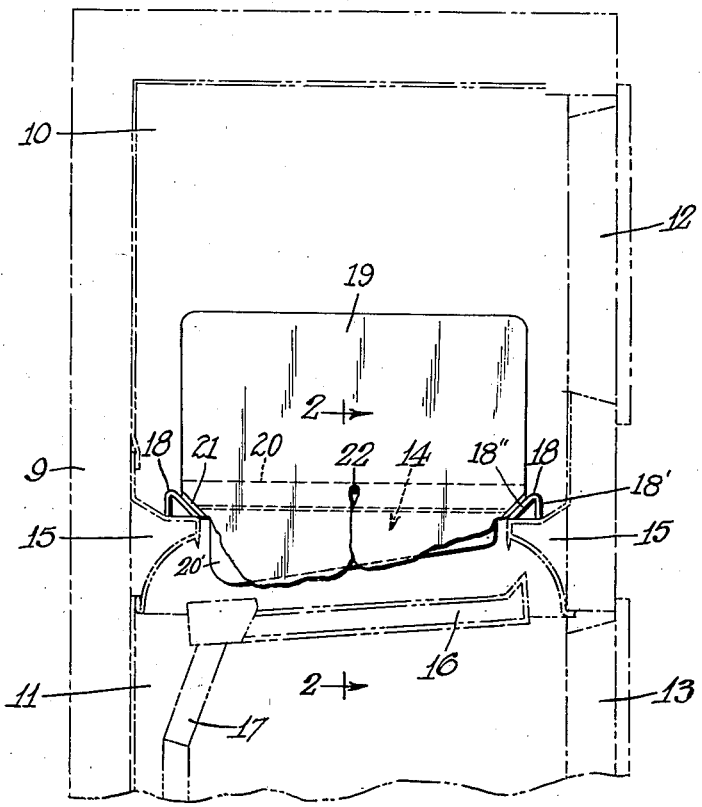

Referring to the drawings, 9 is a refrigerator having an ice chamber 10 at the top thereof and a food compartment 11 beneath the ice chamber with suitable doors 12 and 13 at the front of the refrigerator. The ice rack 14 is supported by ledges 15 at the front and rear of the refrigerator and at the bottom of the ice chamber. A drip pan 16 is located directly beneath the ice rack 14 and is tilted downwardly from front to rear and has a drain pipe 17 at the lowermost portion thereof. The drip pan functions to catch the water from the melting ice and to conduct it to the drain pipe 17 which extends down through the bottom of the refrigerator. The drip pan also functions in cooperation with the ledges 15 to direct the circulation of air in the food compartment by causing the rising warm air which strikes the bottom of the tilted pan to float up the inclined bottom surface thereof toward the front of the refrigerator and around the front end of the pan and back over the pan beneath the ice and the ice rack where the air is chilled, and the chilled air will continue to flow downwardly between the drip pan and the ice and ice rack to the rear of the refrigerator and thence down into the food compartment.

Figure 2:
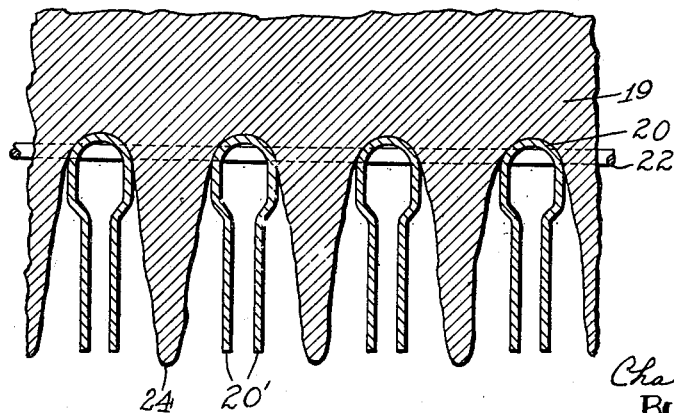
Fig. 2 is a vertical sectional view on the line 2—2 of Fig. 1.

The ice rack comprises front and rear supporting members 18 which are each preferably made of sheet metal bent to angle form in cross-section and having a substantially vertical outer side 18', an inclined side 18'' and an open bottom. The supporting members are mounted on the ledges 15 and the inclined sides 18'' help to position and center the cake of ice 19 on the ice rack. A plurality of rack bars 20 preferably arranged in parallel relation are provided at their ends with ears 21 which are fastened to the supporting members 18 by rivets 21' or other suitable fastening means. I prefer to make the rack with bars each formed from sheet metal bent upon itself to provide a hollow head of comparatively large cross-section and having two spaced and substantially parallel depending sides 20' which are of greater depth at one end than at the other, the deeper end being preferably located at the rear of the refrigerator. The air from the food compartment circulates from front to rear of the refrigerator between the drip pan and the ice and consequently the ice will melt faster at the front than at the rear of the ice rack. The rack bars are preferably made deeper at the rear than at the front so that they will conduct more heat at the rear than at the front and in this way cause the ice to melt where the circulating air is cold at the rear of the rack in as near the same ratio as possible with the melting of the ice caused by the warm air at the front of the rack. The depending sides of the rack bars are bent inwardly below the top of the bars to enlarge the space between the bars and the ice fins 24, Fig. 2, and thereby increase the volume of air which circulates in contact with the ice. In Fig. 2 I have shown the rack bars rounded at the head but I may use a rack bar 25 as shown in Fig. 7 or a rack bar 26 as shown in Fig. 8, both of which rack bars have their depending sides bent inwardly into closer spaced relation. A cake of ice for the ice chamber should be of sufficient size to shut off communication between the food compartment and the ice chamber and it should be arranged upon the ice rack in as nearly centered position as may be convenient. The angular supporting members 18 at the front and at the back of the ice chamber assist in positioning the ice cake with relation to the front wall and the back wall of the ice chamber and it is comparatively easy to position the ice cake with relation to the side walls. The angular supporting members also assist in maintaining the ice cake in centered position on the ice rack but are not sufficient by themselves to prevent the cake from floating or sliding or tilting on the rack into contact with a wall of the ice chamber.

A cross member 22 is secured to the rack bars at or about the top thereof and preferably midway between their ends. This cross member is preferably in the form of a wire or a rod of rather small cross-section so that it will melt a narrow groove into the bottom of the ice cake as the cake melts. The walls of the groove will fuse together below the cross member as the ice cake lowers, as shown in Fig. 1, thereby locking the cake of ice to the rack and preventing it from floating or sliding forward or backward on the rack. In some places ice companies contract with customers to keep their refrigerators supplied with ice at a specified price for a given period and it is possible under such conditions for a customer having a contract to transfer ice from his refrigerator to the refrigerator of another person who is not operating under a contract. The cross member quickly becomes embedded in and anchored to the ice cake and locks the ice cake to the rack. This will ordinarily preclude the withdrawal of the ice cake from the ice chamber and prevent a contracting customer from passing the ice along to someone else. But except for this function of preventing removal of an ice cake from the ice chamber it is not necessary that the cross member should be locked as described in the ice cake to perform its other functions. The cross member also serves in a novel manner to maintain the ice cake substantially level in the ice chamber. The rack bars are designed to cause the ice cake to melt evenly at the bottom under a normal circulation of air in the food compartment but the circulation of air often becomes abnormal due to opening the door of the food compartment and to the insertion of hot foods or foods at room temperature. Such an abnormal circulation caused by sudden rise of the temperature of the air in the food compartment will cause the ice cake to melt rapidly at the front of the rack and to an extent beyond that for which the depth of the depending sides of the rack bars is expected to compensate. The rapid melting of the ice cake occurs directly above the rack bars at the front of the rack and leaves a space of more or less size, depending upon conditions, between the ice and the top of the bars. If it were not for the support given by the cross member the ice cake would tilt forwardly and this tilting would continue due to the melting action until the ice cake rested against the front wall of the ice chamber which would cause the ice to melt more rapidly and advance the tilted position. But the cross member provides that additional support for the ice cake which is necessary to compensate for the loss of weight of the cake at the front part thereof due to excessive melting. When the excessive melting at the front of the cake occurs the center of gravity of the cake will be shifted rearwardly and the front part of the cake may not rest at all or only partly on the rack in front of the cross member. Since the weight of the cake is thus carried on the rear part of the rack it will now melt rapidly at the rear until the front part of the ice cake again contacts with the rack, and if the abnormal heat condition continues the front part of the ice cake may again melt until it is free from contact with the rack bar. This alternate rapid melting at the front and at the rear of the ice cake will be repeated until the normal circulation of air has been restored and the rack bars by reason of their shape will insure uniform melting of the ice cake and maintain it in level position in the ice chamber.

While the cross member functions to maintain the ice cake substantially level in the ice chamber and to prevent it from tilting forwardly or backwardly into contact with the walls of the ice chamber, it has the further function of providing a fulcrum for the ice cake to cause the cake to rock slightly forward and backward as it melts. The cross member 22 passes through the heads of the rack bars near the top thereof and therefore parts of the cross member will be contained within the rack bars and intermediate parts will be exposed between the rack bars. The exposed parts of the cross member contact directly with the ice and become embedded therein as the ice melts and fuses together below the cross member. The temperature of the parts of the cross member embedded in the ice is about the same as the temperature of the ice. The temperature of the parts of the cross member contained within the rack bars may be somewhat higher than the temperature of those parts embedded within the ice because the parts within the rack bars are exposed to the circulating air, but the cross member is of small cross-section and the higher temperature in the parts within the rack bars will not materially affect the temperature of the embedded parts of the cross member. The fact is the cross member will not melt into the ice cake as rapidly nor to the same extent as the rack bars because the cross member is embedded in the ice cake and the rack bars are exposed to the circulating air and the cross member will therefore serve as a fulcrum for the cake. When the front part of the bottom of the ice cake melts away rapidly under abnormal conditions, as heretofore described, the rear part of the ice cake will be heavier than the front part and the cake will rock slightly on the cross member rearwardly; and when the front part of the ice cake becomes the heavier due to the more rapid melting of the rear part, the cake will rock slightly forwardly upon the cross member. The rocking or pivoting of the ice cake upon the cross member as a fulcrum occurs during normal as well as abnormal circulation of air beneath the cake, but to a somewhat greater extent under abnormal circulation than under normal circulation.

The cross member may be employed with a rack of any suitable construction and I prefer to make it in the form of a wire rod secured to the rack bars midway between their ends, as shown in Figs. 1 and 2, to obtain all of the advantages resulting from its use. More than one straight rod cross member may be used in the same rack, or the member may extend diagonally across the rack bars as shown at 22', Fig. 5, or in a zigzag fashion as shown at 22'' in Fig. 6. The cross member is conveniently fastened to the rack bars by passing it through openings 23 therein, but it may be arranged on top of the rack bars and welded or soldered thereto.

I have shown and described my invention in preferred forms but changes and modifications may be made in the form, construction and arrangement of parts without departing from the spirit or sacrificing the advantages of the invention and I reserve the right to make all such changes and modifications as may be necessary or desirable to satisfy different conditions and within the scope of the following claims:

I claim:

1. An ice rack for supporting a cake of ice in the ice chamber of a refrigerator and comprising a plurality of parallel rack bars, and sheet metal ice supporting and centering members secured to the ends of said bars and bent to provide substantially vertical outer sides and oppositely inclined inner sides to receive and center the cake on the rack.

2. An ice rack for supporting a cake of ice in the ice chamber of a refrigerator and comprising a plurality of parallel rack bars having laterally extending and inclined ears at their ends, supporting members having oppositely inclined inner sides to receive and center the cake on the rack, and means securing said ears to said inclined sides.

3. An ice rack comprising a plurality of bars spaced apart for supporting a cake of ice in the ice chamber of a refrigerator, said bars being hollow whereby air may circulate therethrough and cause the bars to melt into the cake of ice and form fins on the cake depending between the bars, each of said bars being narrowed below the top thereof to enlarge the spaces between the bars and the fins and thereby increase the volume of air capable of circulating in said spaces in direct contact with the fins.

4. An ice rack comprising a plurality of bars spaced apart for supporting a cake of ice in the ice chamber of a refrigerator, said bars being hollow whereby air may circulate therethrough and cause the bars to melt into the cake of ice and form fins on the cake depending between the bars, each of said bars having an enlarged head and depending sides, said bars being spaced further apart at the sides than at their heads to enlarge the spaces between the sides and the fins and thereby increase the volume of air capable of circulating in said spaces in direct contact with the fins.

5. An ice rack comprising a plurality of bars spaced apart for supporting a cake of ice in the ice chamber of a refrigerator, said bars being hollow whereby air may circulate therethrough and cause the bars to melt into the cake of ice and form fins on the cake depending between the bars, each of said bars having inwardly bent depending sides to enlarge the spaces between the bars and the fins and thereby increase the volume of air capable of circulating in said spaces in direct contact with the fins.

6. An ice rack comprising a plurality of bars spaced apart for supporting a cake of ice in the ice chamber of a refrigerator, said bars being hollow whereby air may circulate therethrough and cause the bars to melt into the cake of ice and form fins on the cake depending between the bars, each of said bars being made of sheet metal bent upon itself to provide an enlarged head at the top thereof and depending sides spaced apart, said sides being bent inwardly below the heads to enlarge the spaces between the sides and the fins and thereby increase the volume of air capable of circulating in said spaces in direct contact with the fins.

7. An ice rack comprising a plurality of bars spaced apart for supporting a cake of ice in the ice chamber of a refrigerator and adapted to melt into the cake of ice and form fins on the cake depending between the bars, and a member extending transversely of the supporting bars to pass through the fins and prevent the ice cake from moving longitudinally on the bars.

8. An ice rack comprising a plurality of bars spaced apart for supporting a cake of ice in the ice chamber of a refrigerator and adapted to melt into the cake of ice and form fins on the cake depending between the bars, and a wire rod extending transversely of the supporting bars to pass through the fins and prevent the ice cake from moving longitudinally on the bars.

9. An ice rack comprising a plurality of bars spaced apart for supporting a cake of ice in the ice chamber of a refrigerator, each of said bars being hollow whereby air may circulate therethrough and cause the bars to melt into the cake of ice and form fins on the cake depending between the bars, and a member extending through the hollow bars and in the path of air flowing therethrough and also extending between the bars and adapted to melt into the fins and prevent the ice cake from moving longitudinally on the bars.

10. An ice rack comprising a plurality of bars spaced apart for supporting a cake of ice in the ice chamber of a refrigerator and adapted to melt into the cake and form fins on the cake depending between the bars, and a member extending transversely of the supporting bars and cooperating therewith to support the ice cake and about which the ice cake may fulcrum upon unequal melting of the cake at opposite ends thereof and thereby compensate for the unequal melting.

11. An ice rack comprising a plurality of bars spaced apart for supporting a cake of ice in the ice chamber of a refrigerator and adapted to melt into the cake and form fins on the cake depending between the bars, and a member extending transversely of the supporting bars substantially midway between their ends and about which the ice cake may fulcrum upon unequal melting of the cake at opposite ends thereof and thereby compensate for the unequal melting.

12. An ice rack comprising a plurality of bars spaced apart for supporting a cake of ice in the ice chamber of a refrigerator, each of said bars being hollow whereby air may circulate therethrough and cause the bars to melt into the cake of ice and form fins on the cake depending between the bars, and a member extending through the hollow bars and in the path of air flowing therethrough and also extending between the bars and adapted to melt into the fins, said member being located substantially midway between the ends of the bars and providing means about which the ice cake may fulcrum upon unequal melting of the cake at opposite ends thereof.

CHARLES F. BELSHAW.